(12) United States Patent
Jones et al.

(10) Patent No.: US 7,441,269 B2
(45) Date of Patent: Oct. 21, 2008

(54) METHOD AND SYSTEM FOR SESSION ACCOUNTING IN WIRELESS NETWORKS

(75) Inventors: Mark Jones, Nepean (CA); Yong Li, Kanata (CA)

(73) Assignee: Bridgewater Systems Corp., Ottawa, Ontario (CA)

( * ) Notice: Subject to any disclaimer, the term of this patent is extended or adjusted under 35 U.S.C. 154(b) by 888 days.

(21) Appl. No.: 10/489,612

(22) PCT Filed: Sep. 30, 2002

(86) PCT No.: PCT/CA02/01468

§ 371 (c)(1),
(2), (4) Date: Aug. 26, 2004

(87) PCT Pub. No.: WO03/030483

PCT Pub. Date: Apr. 10, 2003

(65) Prior Publication Data

US 2005/0003798 A1 Jan. 6, 2005

(30) Foreign Application Priority Data

Sep. 28, 2001 (CA) .................................. 2358083

(51) Int. Cl.
*G06F 21/00* (2006.01)
*H04M 1/68* (2006.01)
*H04K 1/00* (2006.01)
*H04L 9/00* (2006.01)

(52) U.S. Cl. .......................... 726/14; 713/171; 380/270; 455/410

(58) Field of Classification Search ........................ None
See application file for complete search history.

(56) References Cited

U.S. PATENT DOCUMENTS

| | | | |
|---|---|---|---|
| 6,148,405 A | 11/2000 | Liao et al. | |
| 6,311,275 B1 * | 10/2001 | Jin et al. | 726/12 |
| 6,643,782 B1 * | 11/2003 | Jin et al. | 726/3 |
| 6,851,049 B1 * | 2/2005 | Price, III | 713/150 |

(Continued)

OTHER PUBLICATIONS

Perkins, C.E., "Mobile IP Joins Forces With AAA", IEEE Personal Communications, IEEE Communications Society, US, vol. 7, No. 4, Aug. 2000, pp. 59-61.

(Continued)

*Primary Examiner*—Christopher A Revak
(74) *Attorney, Agent, or Firm*—Sterne Kessler Goldstein & Fox, p.l.l.c.

(57) ABSTRACT

Wireless data services such as wireless email are becoming common, and in particular, "always-on" systems, where new email is automatically forwarded by the service provider to the wireless device. The problem is that there is no effective mechanism for implementing "always-on" systems when the user is moving around a network, or from one network to another. The invention addresses this problem by generating a session key at the service provider's system for a given data session, and returning this session key to the mobile device. Each time the mobile device communicates with the service provider, it enters this session key into a field that will simply pass through the communication network to the service provider. This allows the service provider to manage the data session, preparing proper accounting records and directing the deletion of stale data sessions on network resources.

17 Claims, 8 Drawing Sheets

U.S. PATENT DOCUMENTS

| | | | | |
|---|---|---|---|---|
| 6,966,004 | B1* | 11/2005 | Jin et al. | 726/5 |
| 7,046,647 | B2* | 5/2006 | Oba et al. | 370/331 |
| 7,158,777 | B2* | 1/2007 | Lee et al. | 455/411 |
| 7,233,664 | B2* | 6/2007 | Soliman | 380/44 |
| 7,298,847 | B2* | 11/2007 | Jing et al. | 380/247 |
| 7,325,246 | B1* | 1/2008 | Halasz et al. | 726/2 |
| 7,346,773 | B2* | 3/2008 | Cam-Winget et al. | 713/155 |
| 2004/0073512 | A1* | 4/2004 | Maung | 705/51 |
| 2004/0181598 | A1* | 9/2004 | Paya et al. | 709/227 |
| 2004/0181603 | A1* | 9/2004 | Rajahalme | 709/230 |
| 2005/0025091 | A1* | 2/2005 | Patel et al. | 370/328 |
| 2005/0154873 | A1* | 7/2005 | Cam-Winget et al. | 713/150 |

OTHER PUBLICATIONS

Metz, Christopher, "AAA Protocols: Authentication, Authorization, and Accounting for the Internet", IEEE Internet Computing, IEEE Service Center, Piscataway, NJ, US, 1999, pp. 75-79.

"Packet Cable Operations Support System", www.cablelabs.com, Mar./Apr. 2001, pp. 1-3.

"PDSN (Packet Data Serving Node)", www.samsungelectronics.com, 2001, p. 1.

"PDSN Solution for CDMA Networks", www.cisco.com, 1992-2001, pp. 1-2.

"Wireless IP-Internet Without Wires", National Communications System, Aug. 2000, vol. 7, No. 4, pp. 1-6.

"Motorola Aspira cdma2000 1X Architecture Solution"; 2000, pp. 1-2.

Pat R. Calhoun, "Comparison of Diameter Against AAA Network Access Requirements", www.diameter.org, Apr. 2000, pp. 1-17.

Tom Hiller, "AAA Requirements for cdma2000", dated Nov. 11, 1999, pp. 1-14.

C. Rigney et al., IETF RFC 2058, "Remote Authentication Dial In User Service (RADIUS)", Apr. 1997, pp. 1-57.

Tim Murphy, "The cdma2000 Packet Core Network", Ericsson Review No. 2, 2001, pp. 88-95.

Perkins Calhoun, "Diameter Mobile Ipv4 Application", www.diameter.org, Jun. 2001, pp. 1-40.

Canadian Office Action for Application No. 2,461,511 dated Jul. 9, 2008, 4 pp.

* cited by examiner

METHOD AND SYSTEM FOR SESSION ACCOUNTING IN WIRELESS NETWORKS

CROSS-REFERENCE TO RELATED APPLICATION

This application is a National Stage entry of International Application No. PCT/CA02/01468, filed Sep. 30, 2002, the entire specification claims and drawings of which are incorporated herewith by reference.

The present invention relates generally to telecommunications, and more specifically, to a method and system which manages session accounting in wireless networks, addressing such problems as hand-off in always-on networks.

BACKGROUND OF THE INVENTION

Over the last decade, digital communication networks such as local area networks (LANs), wide area networks (WANs), virtual private networks (VPNs) and the Internet have increased levels of communication and access to information by an incredible degree. Wireless services over cellular telephone networks, packet data networks, wireless local loops and similar systems are now continuing the digital communications and data access revolution in a mobile environment.

In the past, wireless users could access a data system periodically to see whether email messages and other digital information had been received. These periodic checks were generally slow and complicated as the end user had to establish a new connection with his service provider each time he wanted an update (in effect, launching email software and accessing an account using a dial-up modem). This process was so slow and ineffective that many end users would simply neglect (or forget) to check their email messages from time to time.

Recently, there has therefore been great interest in the provision of "always-on" wireless services. Rather than relying on the end user to launch special software, establish a connection, gain authorization and download his email periodically, always-on services provide the ability to download email and similar messages to the end user's device automatically when they are received by the service provider, regardless of whether the end user is presently using his mobile device. Always-on therefore provides a user experience similar to hardwired telephones and email on stationary computers: that emails and other data are forwarded to wireless users as they are received by the system. In many cases, announcements are issued by the mobile device when email is received.

Figure 1:
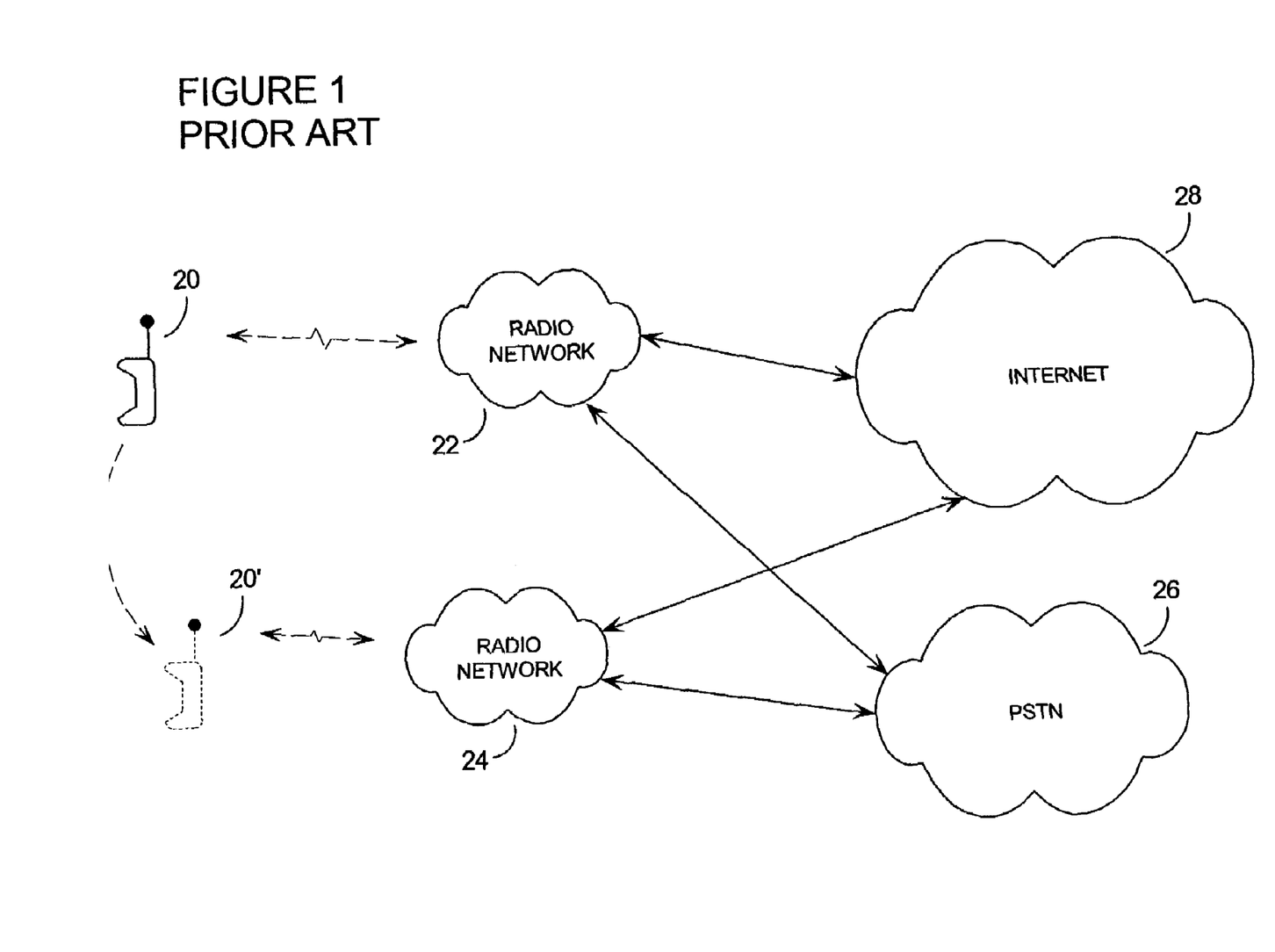
FIG. 1 presents a block diagram of an exemplary communication network as known in the prior art, for the purpose of discussing hand-off.

A classic problem in mobile wireless environments is how to manage the hand-off of communication sessions from one base station to the next as the mobile user moves around the network, or from one network to another. This problem can be described with respect to the simple block diagram of FIG. 1, where a mobile node 20 is passing from the area served by a radio network 22, to a location 20' served by radio network 24. Both of the radio networks 22 and 24 are connected to various communication networks such as the public switched telephone network (PSTN) 26 and the Internet (IP Network) 28. (Note that the network of FIG. 1 is a gross simplification, intended simply to present the general handoff problem. The details of an actual implementation would be well known to one skilled in the art.)

The user of the mobile node 20 may, for example, be talking to another party having a hardwired telephone connected to the PSTN 26. When the user of the mobile node 20 moves to position 20', radio network 24 must pick up the communication without interrupting or dropping the call. The transfer from radio network 22 to radio network 24 is referred to as "handoff" in the art. While it is clearly a sophisticated task, this handoff problem becomes even more difficult when the wireless service is an always-on data service.

In certain wireless data networks, the session handoff between fixed network elements such as radio networks 22 and 24 is initiated by the mobile node 20 rather than the network elements themselves, and there is no communication between the elements of radio networks 22 and 24 concerning the handoff. This is especially true where the mobile node 20 enters a dormant state and then moves into an area covered by a new network element. A "dormant state" is a state in which the mobile device 20 is not sending or receiving data. Email notifications and the like should still be received by the end user's mobile device 20, causing it to transition back to an active state.

For example, the mobile node 20 may have a data session provided by radio network 22 and then enter a dormant state. The mobile node 20 then moves to an area where data coverage is provided by radio network 24. When the mobile node 20 sends out one of its periodic requests for an email update, the request will be received and handled by radio network 24. The radio network 22 may not be notified that a handoff has taken place, thus leaving a stale session on radio network 22 (i.e. radio network 22 is awaiting another message with the current session identifier from the mobile node 20, but the message will never come). The context for this stale session will typically remain on radio network 22 until a pre-configured timeout period has elapsed.

In order to provide for 'always-on' services, the pre-configured timeout period mentioned in this example is frequently on the order of hours rather than minutes. This consumes resources unnecessarily on the radio network 22 and other network elements holding the stale session.

As well, this situation significantly complicates the billing process because accounting records for data sessions that span many network elements, must be correlated in order to produce a single record. In always-on systems it is common to bill end users based on the volume of data that they transfer, and also for the amount of time they are connected, even if their mobile unit is in a dormant state. In the scenario described above, where the mobile node 20 has moved from one area to another while in a dormant state, there may be two (or more) radio networks who believe they are providing the always-on connectivity for the mobile node 20. Clearly, only one radio network is really providing this connectivity service at a time, so the conflict must be resolved.

One possible solution to the billing problem is the use of interim accounting records. These records could be sent from the radio networks 22 and 24 at regular intervals following session setup, and report usage metrics for the data session. Using these interim accounting records, a stateful Authentication, Authorization and Accounting (AAA) server could use the session setup event on the new network element to trigger the generation of a billable record based on the last interim accounting record received from the previous network element.

The main disadvantage of this solution is that the sending of the interim accounting record will rarely coincide with the handoff event, so the usage information that would appear in the next interim accounting record is effectively lost. This lost usage information translates to lost revenue for the network operator. The amount of usage lost can be minimized by sending interim accounting records at more frequent intervals but storing and processing these additional accounting records increases the operational costs.

There is therefore a need for a method for session accounting in wireless data networks, in particular, for always-on systems where there is no session handoff communication between the network elements.

SUMMARY OF THE INVENTION

It is an object of the invention to provide a method and system which obviates or mitigates at least one of the disadvantages described above.

One embodiment of the invention uses a context attribute to store a session key which is subsequently used by the AAA server to trigger the generation of the appropriate accounting records and/or termination of a stale data session. Such context attributes are typically returned by the AAA server to the network element (possibly including the mobile device itself) on successful authentication and authorization of the data session, and are echoed by the network element back to the AAA server in subsequent event messages for the data session.

An additional aspect of the invention is defined as the algorithm used by the AAA server to detect a stale session, determine whether subsequent incoming accounting records relate to a stale session and whether the usage information reported in the accounting record is relevant for billing purposes.

One aspect of the invention is broadly defined as a method of session management a wireless network comprising the steps of: in an Authentication, Authorization and Accounting (AAA) server, responding to a request to authorize a data session for a mobile node by: determining whether a session state store contains a record of a previous session for the mobile node, and if so: retrieving a session key assigned to the previous session for the mobile node; returning the session key assigned to the previous session, to an element of the wireless network, the session key assigned to the previous session being stored in a parameter of the response message that the wireless network element will echo back in all future messages related to the current data session; whereby the session key can be used to identify all communications between AAA server and wireless network elements for the data session.

BRIEF DESCRIPTION OF THE DRAWINGS

These and other features of the invention will become more apparent from the following description in which reference is made to the appended drawings in which.

DESCRIPTION OF THE INVENTION

Figure 2:
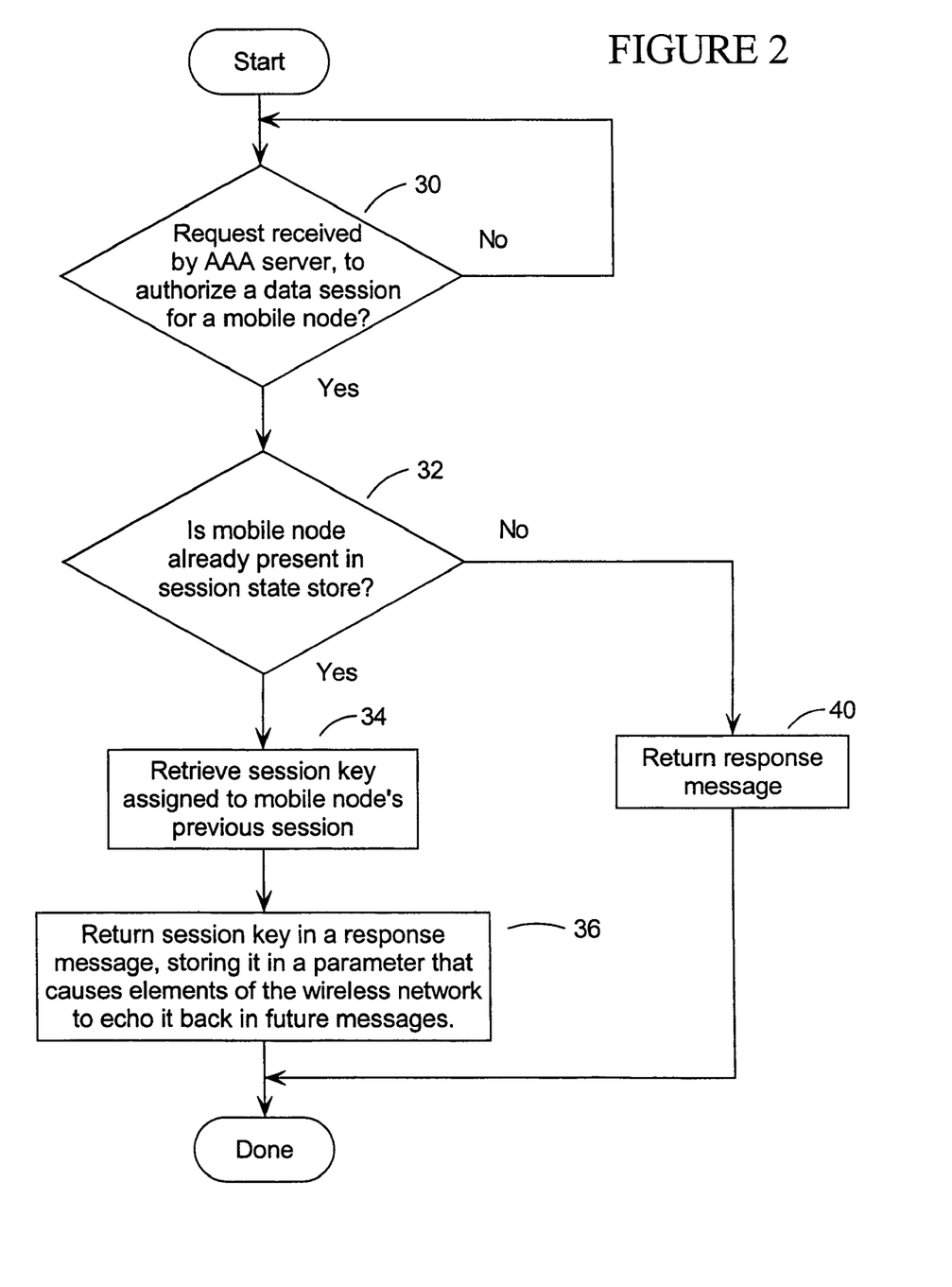
FIG. 2 presents a flow chart of a method of targeted distribution in a preferred embodiment of the invention.

A methodology which addresses the objects outlined above, is presented as a flow chart in FIG. 2. This figure presents a method of session management for wireless networks which is administered by an Authentication, Authorization and Accounting (AAA) server. AAA servers are known in the wireless art, and are generally used to:

authenticate subscribers;

control which services they can access, as well as when they can be accessed; and determine how they will be accounted for in the system.

Subscribers can access the system using mobile devices, which are referred to herein as "mobile nodes". These mobile nodes can be any communication device which has the functionality to communicate with the wireless system of the invention as it roams from network to network. It may be, for example: a cellular telephone, video telephone, personal digital assist, wearable computer, laptop computer, or computer build into a car or other vehicle.

In the case of the invention, the AAA server is configured to respond a request to establish a data session for a mobile node at step 30 of FIG. 2, first by determining whether a record has been made for the mobile node in the session state store, at step 32. A session state store is a datastore that may be local or remote to the AAA server, which contains state information for a given mobile node identifier. This identifier may be, for example, the calling number of the mobile node if the mobile node only supports a single user data session at any one time. If the mobile node supports multiple simultaneous user data sessions, the AAA server may generate an identifier that uniquely identifies each user data session (see section below entitled "Mobile Device storage of User Session Identifier Application").

If it is determined at step 32 that a record exists in the session state store for the mobile node, then:

1. the session key that was assigned to the mobile node's previous session is retrieved at step 34.

Session keys are network-wide unique identifiers for mobile node data sessions. Though they are known in the art, their use is limited to applications involving single PDSNs.

These session keys are typically generated by applying some algorithm (such as a hash function) over one or more attributes that appear in all AAA messages for a given session. The algorithm and attributes used to generate the session key are implementation specific;

2. the session key is then returned to the mobile node in a response message at step 36, where the session key is stored in a parameter of the response message which elements of the wireless network will echo back in future messages.

If it was determined at step 32 that no record existed in the session state store for the mobile node, then a regular response message would be returned at step 40.

It should be noted that a new session key is not assigned at the time of authentication/authorization since confirmation of the session creation only occurs on receipt of the accounting start message.

This description is deliberately brief to focus on the essence of the invention. It would be clear to one skilled in the art that the software necessary to implement the invention might be considerably more complex. One skilled in the art would, however, be able to implement the invention from the teachings herein.

For example, step 30 would generally not be implemented as the control loop shown in FIG. 2. Typically, the process of FIG. 2 would exist as a software routine that would only be launched when the AAA server receives a request to initiate a new data session.

As well, the session key mentioned in steps 32 through 36, and the manner in which it would be generated, is not limiting on the invention. It could, for example, be quite short in length if other measures were taken to identify and authenticate separate users. In the description of the preferred embodiment of the invention which follows, for example, the session key consists of the IP address of the PDSN appended to the identifier assigned by the PDSN when the session was initiated.

Finally, the step of returning the session key in a parameter that will cause it to be echoed back (step 36) may be straightforward in certain standard protocols that already have parameters and fields which support such functionality. The AAA protocols RADIUS (Remote Authentication Dial In User Service) and Diameter, for example, have suitable parameters. The implementation of the invention in these environments will be described in greater detail hereinafter.

Of course, other existing or future communication protocols could also be modified to support such echoing, as techniques for doing so are known in the art.

The invention of FIG. 2 addresses the problems in the art. It allows mobile nodes to roam from one network to another without difficulty, because the stale session key will be echoed back with each message the mobile node transmits during the active session. This allows the AAA servers to recognize messages relating to the stale session, and handle them accordingly.

Hand-offs can be properly accounted for, and network resources released because the AAA server can correlate various requests to set up data sessions, communicating this information back to other network nodes. Even if the mobile node is in a dormant state when the hand-off is effected, the AAA server still maintains this "awareness" of the existing session.

As will be explained in greater detail with respect to the preferred embodiment, the use of the session key also allows stale sessions to be terminated. Simply, if one radio node requests an update on the status of a session, while another node reports an active session using the same session key, clearly the older session can be terminated and the accounting records updated.

In the prior art, it may have taken hours before the stale session was discarded, tying up network resources and resulting in unbillable costs. With the invention, the network resources can be freed up quickly, and unbillable costs be minimized.

Figure 3:
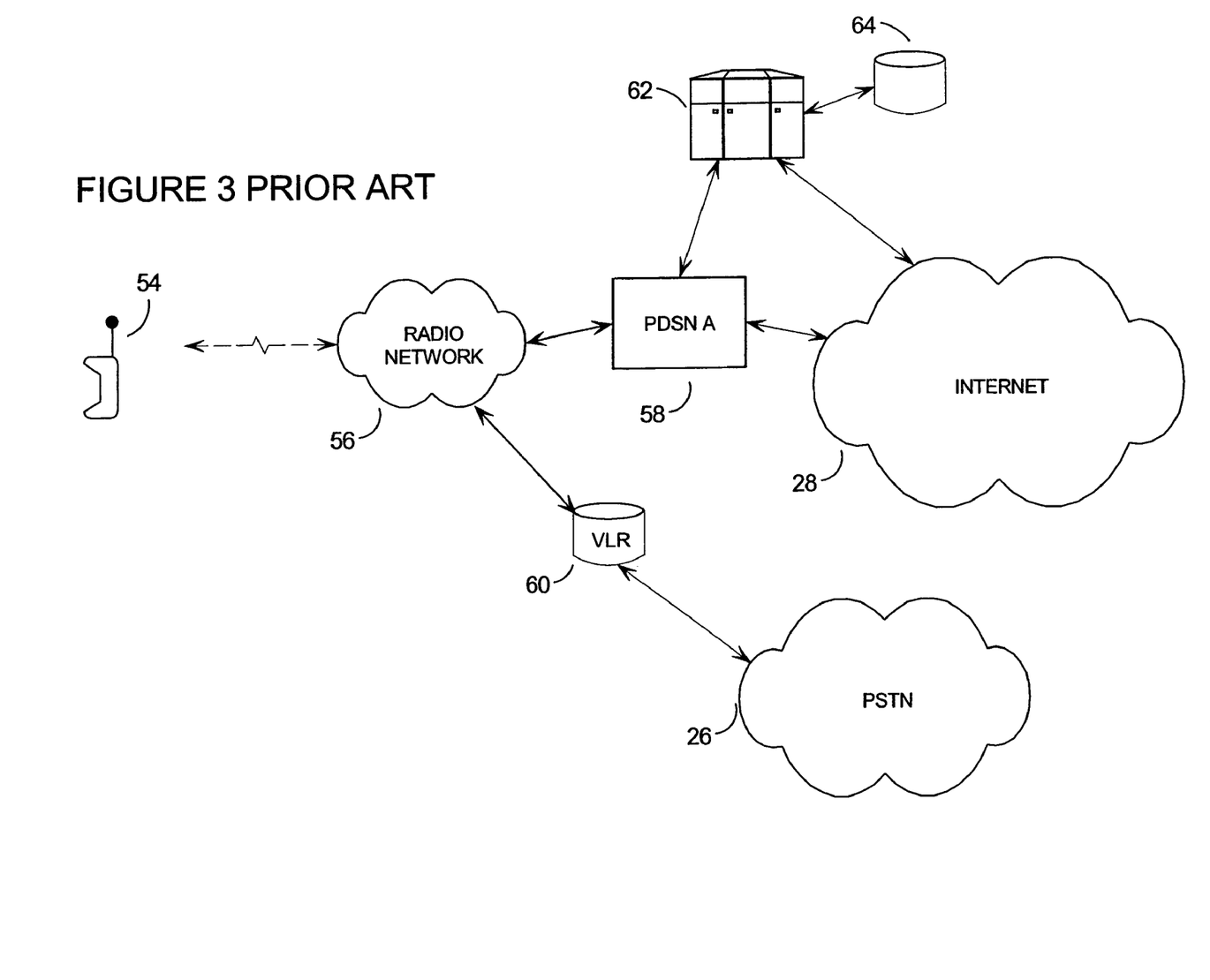
FIG. 3 presents a block diagram of an exemplary CDMA2000 wireless network as known in the art.
Figure 4:
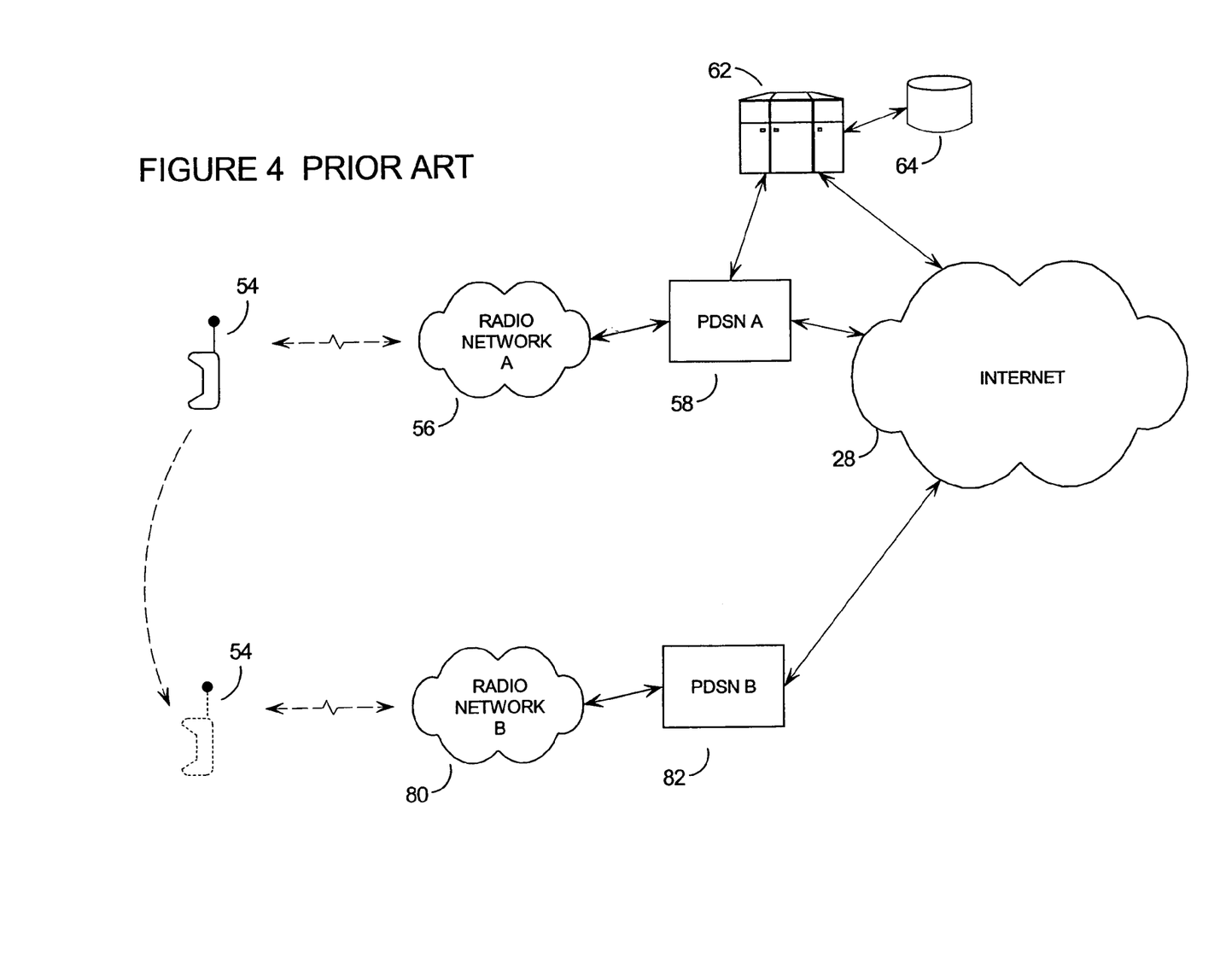
FIG. 4 presents a block diagram of how handoff would be effected in an exemplary CDMA2000 wireless network as known in the art.

The preferred embodiment of the invention will now be presented in by means of the block diagrams presented in FIGS. 3 and 4, and the message sequence diagrams of FIGS. 5A, 5B, 6A and 6B.

DETAILED DESCRIPTION OF THE PREFERRED EMBODIMENTS OF THE INVENTION

The preferred embodiment of the invention will be described with respect to a CDMA2000 wireless network, but clearly, the invention need not be limited to CDMA2000 applications or to comparable communication systems. As well, many details of the CDMA2000 network will be described in the interest of completeness, though many of these details are not limiting on the invention.

CDMA2000 is the 3rd Generation solution based on IS-95, supporting 3G wireless services as defined by the International Telecommunications Union (ITU) for IMT-2000. 3G networks are intended to deliver wireless services with better performance, greater cost-effectiveness and significantly more content.

The basic communication technology, code division multiple access (CDMA) is well known in the art. CDMA uses unique coding for each call or data session which allows mobile nodes to disregard other transmissions in the same frequency band. In effect, CDMA allows a number of mobile nodes in an area to use the same frequency spectrum, separating the calls by encoding each one uniquely.

A typical CDMA2000 network may be implemented as shown in FIG. 3, where a mobile node 54 communicates with the rest of the system via radio network 56. This radio network 56 may consist of various base stations, base station controllers (BSCs) and Packet Control Function elements (PCFs). The details of these elements are known in the art, and do not play a significant role in the invention so they will not be discussed at length. In short, the components of the radio network 56 allow wireless intercommunication between the mobile node 54 and the rest of the system, digital data being sent to and from the Packet Data Serving Node A (PDSN A) 58, and analogue voice data being sent to and from the VLR 60 connected to the Public Switched Telephone Network (PSTN) 26. The VLR (visitor location register) 60 is a database that is updated with certain subscriber information when a user roams into the area it serves. The focus of the invention is on the data side, so the VLR 60 and PSTN 26 components will not be addressed any further.

On the data side, the PDSN A 58:

1. acts as the gateway between the radio network 56 and external packet data networks (such as the Internet 28), performing packet processing and re-direction to the mobile node 54 through communications with the home agent (i.e., it operates as a RADIUS client toward an AAA server, in this case the stateful RADIUS server 62); and
2. is responsible for aggregating accounting information from the radio resource domain via updates sent from the PCF elements on the radio network 56 and for combining this data with its own packet traffic information to form complete accounting records.

As noted above, AAA servers contain subscriber packet-data-provisioning information and are used to authenticate and determine the parameters of a subscriber's packet-data session. That is, they enable service providers to ensure a user's identity to control which services users can access, when and where they can access them, and how they will be accounted for. The stateful RADIUS server 62 may also be used as a store-and-forward point for accounting data in the form of usage data records (UDR) generated by the PDSN 58. If necessary, an external database 64 may also be used for storage of accounting records.

There are two roaming scenarios that must be considered in the CDMA2000 environment. In the PCF-to-PCF handoff scenario (intra-PDSN), the mobile node 54 moves from one base station controller to another, and both BSCs are connected to the same PDSN. This type of handoff will generally not require the renegotiation of the data session between the mobile node 54 and PDSN, since the PDSN can re-associate the state of the mobile node 54 with the new base station controller. In any event, methods exist for PCF-PCF handoff, so this need not be addressed.

However, dormant handoff between PDSN is not addressed in the art. In the PDSN-to-PDSN handoff scenario, the mobile node 54 roams into an area covered by a different PDSN in the same network or into a new network with a different PDSN.

Focussing on the digital data components, PDSN-to-PDSN handoff in a CDMA2000 network could be affected as shown in FIG. 4. Both geographical regions include similar radio networks A and B (56 and 80); and PDSNs 58 and 82. As well, of course, both systems have access to the Internet network 28, which allows PDSN 82 to communicate with the stateful RADIUS server 62.

When the mobile node 54 moves to location 54', handoff must be effected from radio network A 56, to radio network B 80.

Figure 5A:
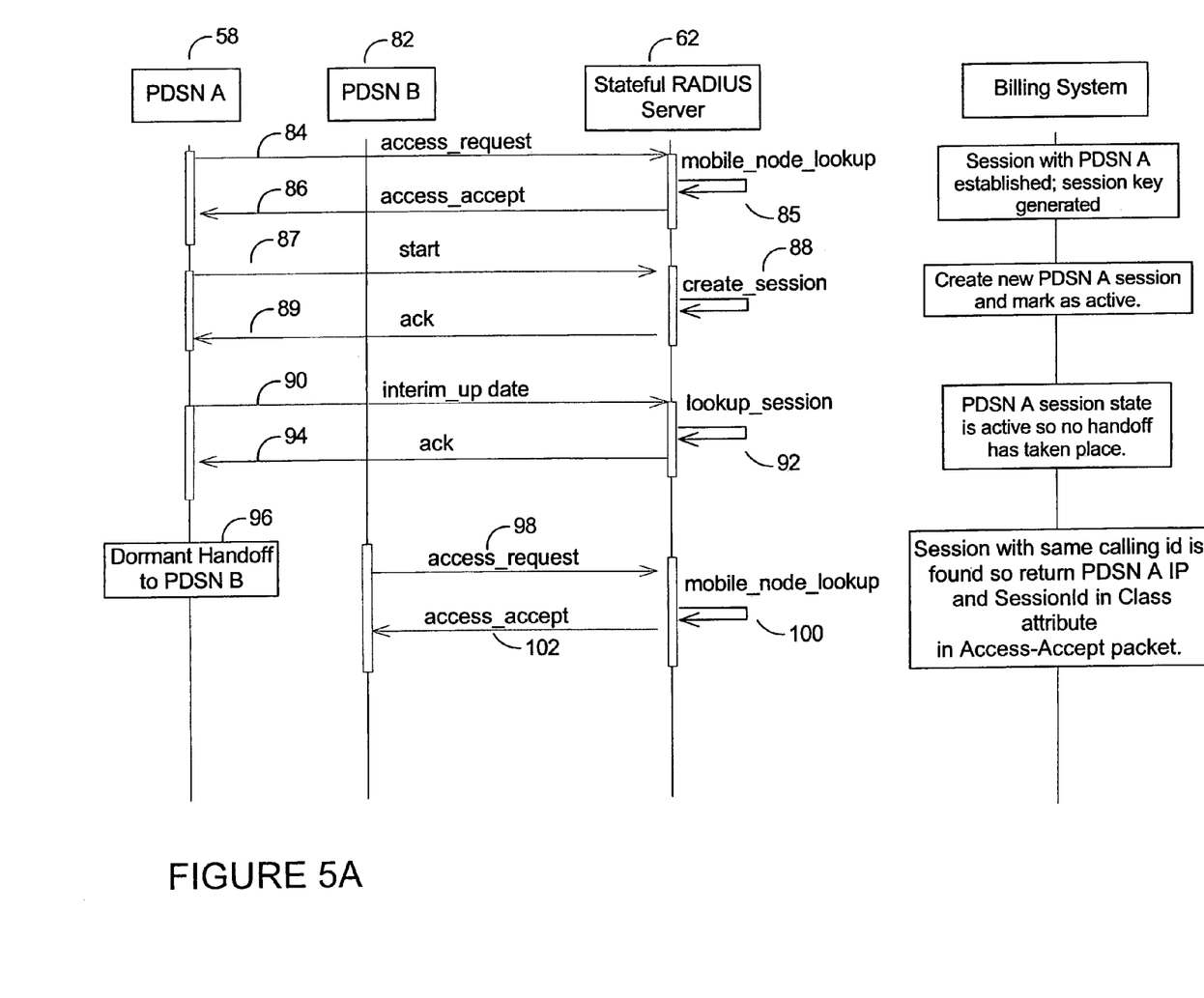
FIGS. 5A and 5B present a message sequence diagram of the RADIUS messages exchanges during a session handoff between network elements in a CDMA2000 network, in a preferred embodiment of the invention.
Figure 5B:
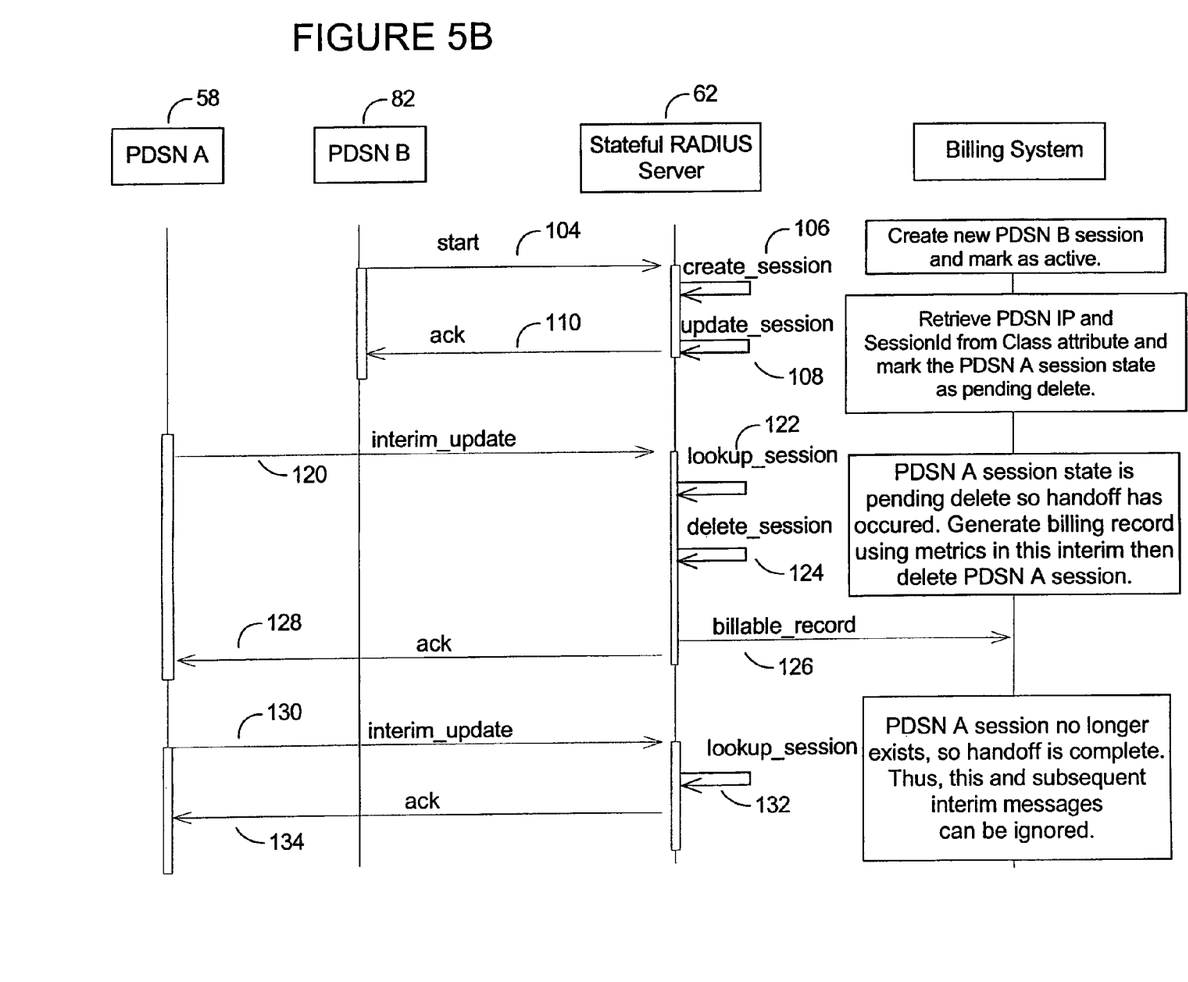

A method of handling this PDSN-toPDSN handoff is presented as a message sequence diagram in FIGS. 5A and 5B. This message sequence diagram presents an application of the invention in a CDMA2000 network using RADIUS as the AAA protocol, though the method of this embodiment is applicable to any wireless data network where the AAA protocol provides a context attribute for use by the AAA server.

An example of such a context attribute is the RADIUS Class attribute (type:25). According to RFC2865, (i.e. Request For Comments titled: "Remote Authentication Dial In User Service (RADIUS)" from the Network Working Group) this attribute "is available to be sent by the server to the client in an Access-Accept and should be sent unmodified by the client to the accounting server as part of the Accounting-Request packet if accounting is supported". RADIUS servers typically use this attribute to store session tracking information such as the resources allocated to the session so that the resources can be de-allocated on receipt of the accounting record confirming the session has terminated. The invention employs the RADIUS Class attribute to identify the stale data sessions in a mobile network where the network elements do not support handoff.

As noted above, two types of data session handoff exist in a CDMA2000 network: those between Packet Control Function (PCF) network elements and those between Packet Data Serving Node (PDSN) network elements. The CDMA2000 specifications (TIA/EIA/IS-835) define the communications that must take place between Packet Control Function (PCF) nodes in the event of a handoff so the stale session scenario does not occur. However, the same specifications fail to define the communication that must take place between Packet Data Serving Nodes (PDSN) in the event of a handoff, so that stale sessions do occur on these network elements.

In the embodiment presented in FIG. 5A, it is assumed that PDSN A 58 does not support RADIUS Disconnect-Request messages. It is also assumed that a wireless data session has previously been established between the mobile node 54 and PDSN A 58, and that IP traffic has been exchanged between the two. This is shown briefly in FIG. 5A as steps 84 through 89; it is understood however, that many other communications may take place (and generally would take place) as part of this communication.

First, at step 84, the PDSN A 58 transmits an access_request message to the stateful RADIUS server 62. The stateful RADIUS server 62 then performs some manner of lookup at step 85 to establish whether the communication should be allowed. If it is determined that communication should proceed, then an access_accept message returned to PDSN A 58 at step 86. Following successful initialization of the data service PDSN A will send an Accounting Start message to the RADIUS server at step 87. This message contains an Acct-Session-Id attribute which in conjunction with the IP address of PDSN A 58 serves to uniquely identify the data session network-wide. On receipt of the accounting start message, the stateful RADIUS server 62 creates a new session record in its cache to track the data session on PDSN A (step 88). A session key is formed from the Acct-Session-Id attribute and the IP address of PDSN A. The session key and mobile node identifier are stored in the new session record. Communication would then proceed, which could include a large or small number of messages which would issue over varying time intervals. This may include, for example, an acknowledgement back to PDSN A 58 at step 89.

At a pre-configured interim interval, PDSN A 58 generates a RADIUS interim update message (step 90). This message contains an Acct-Session-Id attribute which in conjunction with the IP address of the PDSN A 58 serves to uniquely identify the data session network-wide. As noted above, this value is stored along with the mobile node identifier in the session state store or cache. Also as noted above, a session state store is a datastore that may be local or remote to the AAA server which contains a mapping from mobile node identifier to session key. A session state store may also contain additional information for a data session, such as additional attributes needed to form a session disconnect request message.

On receipt of the interim update message, the stateful RADIUS server 62 extracts the PDSN IP address and Acct-Session-Id to form a session key which it then looks up in its cache (step 92). Since the session is found to be modelled as active, the RADIUS server 62 determines that it is an interim update from an active session and an acknowledgement is returned to PDSN A 58 (step 94).

The mobile node 54 then ceases to exchange IP traffic with PDSN A 58 and some time later moves into a dormant state (step 96). While in this dormant state, the mobile node 54 moves outside the area covered by PDSN A 58 into the area covered by PDSN B 82 and the mobile node 54' re-initiates the data session.

The mobile node 54' contacts the PDSN B 82 and the PDSN B 82 sends a RADIUS access request message to the stateful RADIUS server 62 at step 98, requesting authorization to setup the data session for the mobile node 54' (note that a variety of techniques are known in the art for locating the home AAA server for a given mobile node). On receipt of the access request message, the stateful RADIUS server 62 performs the usual authentication and authorization process, then checks for the existence of a pre-existing data session from the same mobile node 54', at step 100. In the context of this example the stateful RADIUS server 62 locates the data session on PDSN A 58 in its cache and constructs a Class attribute containing the IP address of PDSN A 58 and the Acct-Session-Id of the data session on PDSN A 58. This Class attribute is appended to the access accept message returned to PDSN B 82 at step 102.

Once PDSN B 82 has successfully set up the new data session, it sends an accounting start message to the Stateful RADIUS server 62 at step 104 of FIG. 5B. At this point, the handoff to PDSN B 82 has successfully taken place and the data session on PDSN A 58 is now stale. In accordance with the RADIUS protocol, the Class attribute received by PDSN B 82 in the access accept message is returned unmodified to the stateful RADIUS server 62 in the accounting start message of step 104. On receipt of the accounting start message, the stateful RADIUS server 62 creates a new session in its cache to track the data session on PDSN B 82 (step 106). It then extracts the IP address and Acct-Session-Id from the Class attribute and updates the state of the stale session in its cache to be that of pending deletion (at step 108) before acknowledging the accounting message at step 110.

At the pre-configured interim interval, PDSN A 58 generates the next RADIUS interim update message at step 120, which contains the metrics for the usage between the last interim update and the handoff to PDSN B 82. On receipt of the interim update message, the stateful RADIUS server 62 extracts the PDSN IP address and Acct-Session-Id to form a session key which it then looks up in its cache (step 122). In the context of this example, the session is found to be marked as pending deletion indicating a handoff has occurred. The stateful RADIUS server 62 then deletes the session from its cache at step 124 and generates an accounting record marking it as the final record resulting from the data session on PDSN A 58 (step 126). An acknowledgement for the interim update message is then returned to PDSN A 58 at step 128.

On receipt of subsequent interim update messages from PDSN A 58 per step 130, the RADIUS server 62 extracts the PDSN IP address and Acct-Session-Id to form a session key which it then looks up in its cache at step 132. Since the session is no longer found to be modelled, the RADIUS server 62 determines that is an interim update from a stale session and ignores it.

Figure 6A:
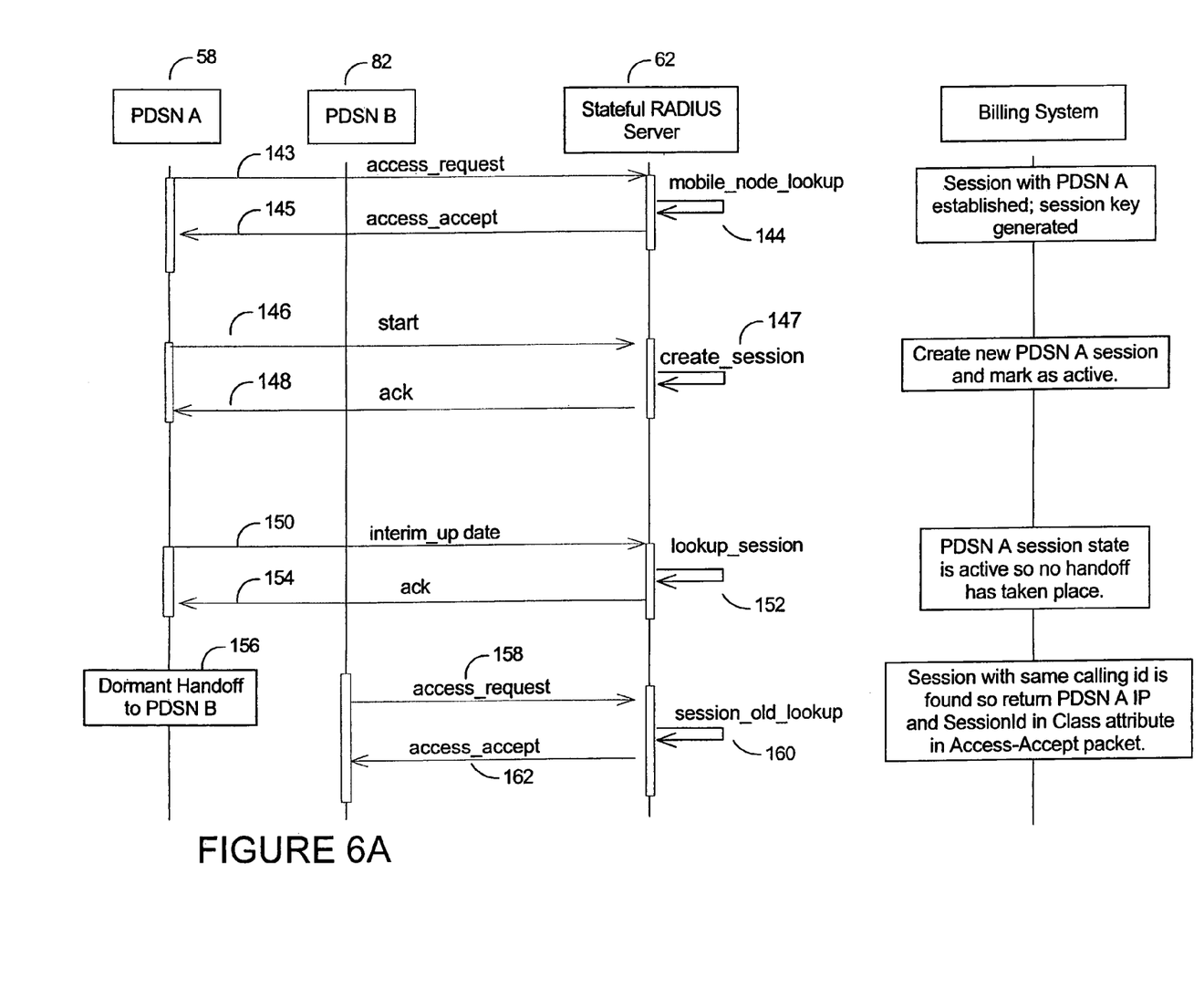
FIGS. 6A and 6B present a message sequence diagram of the RADIUS messages exchanges during a session handoff between network elements in a CDMA2000 network where the PDSN support the unsolicited session termination request, in a preferred embodiment of the invention.
Figure 6B:
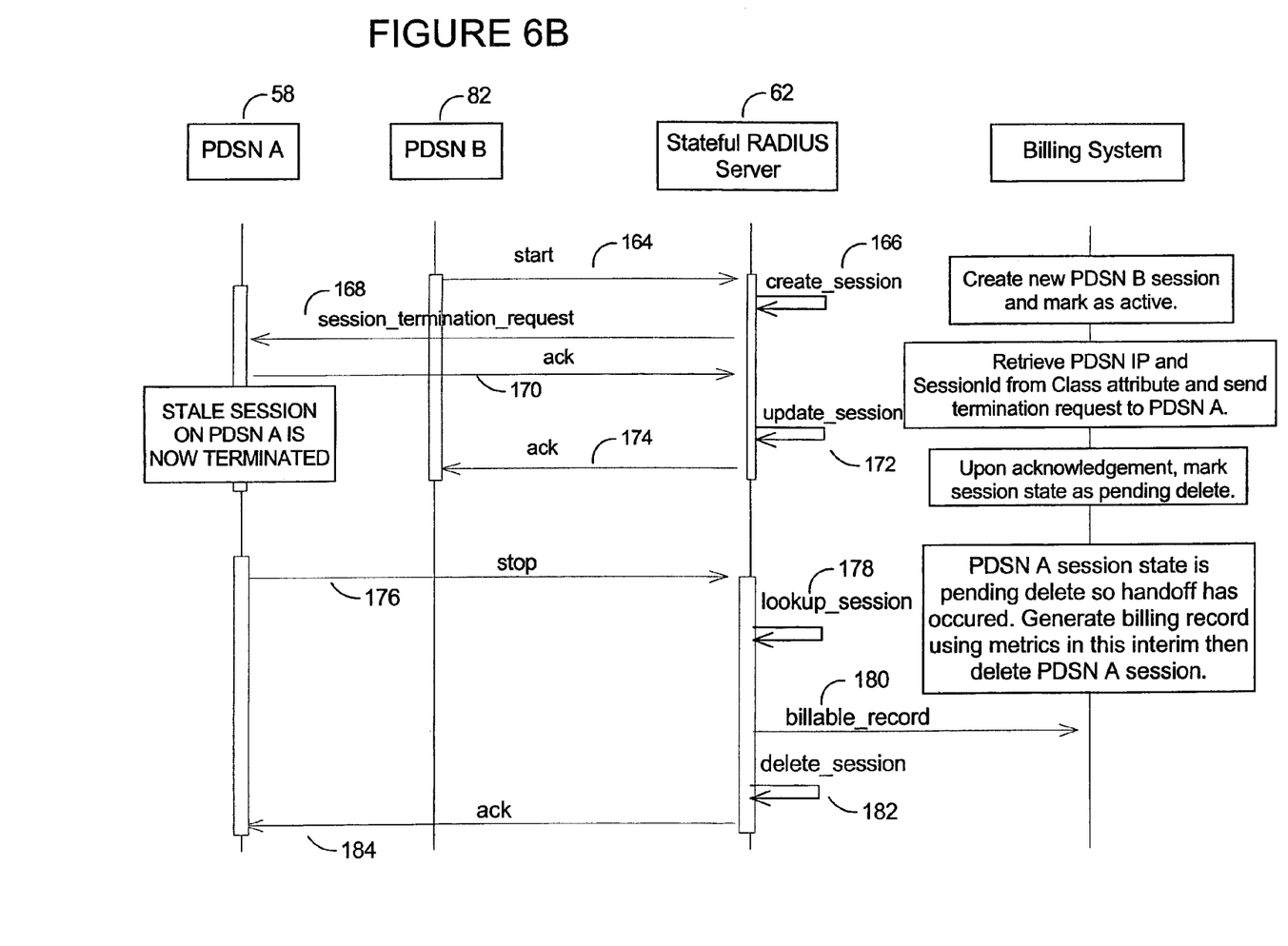

A further method which addresses the objects outlined above is presented as a message sequence diagram in FIGS. 6A and 6B. This message sequence diagram presents an application of the invention in a CDMA2000 network using RADIUS as the AAA protocol where PDSN A 58 supports a RADIUS Disconnect-Request messages from the AAA server. The disconnect messages are described in the Internet Draft entitled 'Dynamic Authorization Extensions to Remote Authentication Dial-In User Service (RADIUS)'. This draft was at revision 5 at the time of writing (draft-chiba-radius-dynamic-authorization-05.txt). Again, the method is applicable to any wireless data network where the AAA protocol provides a context attribute for use by the AAA server and session termination by the AAA server is supported.

As in the case of FIG. 5A, it is assumed that a wireless data session has previously been established between the mobile node 54 and PDSN A 58, and that IP traffic has been exchanged between the two. This process is presented in a simplified form in FIG. 6A as steps 143 through 148; it is understood however, that many other communications may take place (and generally would take place) as part of this communication.

First, at step 143, the PDSN A 58 transmits an access_request message to the stateful RADIUS server 62. The stateful RADIUS server 62 then performs some manner of lookup at step 144 to establish whether the communication should be allowed. If it is determined that communication should proceed, then an access_accept message is returned to PDSN A 58 at step 145. Following successful initialization of the data service PDSN A will send an Accounting Start message to the RADIUS server at step 146. This message contains an Acct-Session-Id attribute which in conjunction with the IP address of PDSN A 58 serves to uniquely identify the data session network-wide. On receipt of the accounting start message, the stateful RADIUS server 62 creates a new session record in its cache to track the data session on PDSN A (step 147). A session key is formed from the Acct-Session-Id attribute and the IP address of PDSN A. The session key and mobile node identifier are stored in the new session record. Communication would then proceed, which could include a large or small number of messages which would issue over varying time intervals. This would generally include, for example, an acknowledgement back to the PDSN A 58 at step 148.

At a pre-configured interim interval, PDSN A 58 generates a RADIUS interim update message (step 150). This message contains the Acct-Session-Id attribute which in conjunction with the IP address of the PDSN serves to uniquely identify the data session network-wide. On receipt of this interim update message, the stateful RADIUS server 62 extracts the PDSN IP address and Acct-Session-Id to form a session key which it then looks up in its cache (step 152). Since the session is found to be modelled as active, the RADIUS server 62 determines that is an interim update from an active session and an acknowledgement is returned to PDSN A 58 at step 154.

The mobile node 54 then ceases to exchange IP traffic with PDSN A 58 and some time later moves into a dormant state (step 156). While in this dormant state, the mobile node 54 moves outside the area covered by PDSN A 58 into the area covered by PDSN B 82 and the mobile node 54' initiates a data session.

The PDSN B 82 then sends a RADIUS access request message to the stateful RADIUS server 62 requesting authorization to setup the data session for the mobile node 54' (step 158). On receipt of the access request message, the stateful RADIUS server 62 performs the usual authentication and authorization process then checks for the existence of a pre-existing data session from the same mobile node 54' (identified by the calling number) (step 160). The stateful RADIUS server 62 locates the data session on PDSN A 58 in its cache and constructs a Class attribute containing the IP address of PDSN A 58 and the Acct-Session-Id of the data session on PDSN A. This Class attribute is appended to the access request message returned to PDSN B 82 at step 162.

Once PDSN B 82 successfully sets up the new data session, it sends an accounting start message to the Stateful RADIUS server 62 at step 164. At this point, the handoff to PDSN B 82 has successfully taken place and the data session on PDSN A 58 is now stale. In accordance with the RADIUS protocol, the Class attribute received by PDSN B 82 in the access accept is returned unmodified to the stateful RADIUS server 62 in this accounting start message.

On receipt of the accounting start message, the stateful RADIUS server 62 creates a new session in its cache to track the data session on PDSN B 82 (step 166). It then extracts the PDSN IP address and Acct-Session-Id from the Class attribute and sends a Disconnect-Request message to PDSN A 58 requesting that the stale session be terminated (step 168). On receipt of the Disconnect-ACK message (step 170) confirming the session termination, the AAA server updates the state of this stale session in its cache to be that of pending deletion (step 172) before acknowledging the accounting message at step 174.

Once the stale session is terminated, PDSN A 58 generates a RADIUS stop message which contains the metrics for the usage between the last interim update and the handoff to PDSN B 82 (step 176). On receipt of this stop message, the stateful RADIUS server 62 extracts the PDSN IP address and Acct-Session-Id to form a session key which it then looks up in its cache at step 178. The session is found to be marked as pending deletion indicating a handoff has occurred. The stateful RADIUS server 62 then generates an accounting record marking it as the final record resulting from the data session on PDSN A 58 (step 180) and deletes the session from its cache (step 182). An acknowledgement for the stop message is then returned to PDSN A 58 at step 184.

Diameter Application

While the above applications assume RADIUS is the AAA protocol, the Diameter protocol can also be used with the same effect. Since Diameter was intended to be backwards compatible with RADIUS, the message sequences in the above diagrams remain unchanged but the names of some of the Diameter messages are different. For example, the Diameter Mobile IPv4 Application defines the AA-Mobile-Node-Request message which replaces the RADIUS Access-Request message and the AA-Mobile-Node-Answer message which replaces the Access-Accept/Reject messages. For the accounting messages, the Accounting-Request message is unchanged but the Accounting-Response message is renamed as Accounting-Answer in Diameter. The same accounting events (start, interim and stop) are also supported in Diameter.

For disconnecting the stale sessions, the Diameter equivalent of the RADIUS Disconnect-Request, Disconnect-ACK and Disconnect-NAK messages are the Abort-Session-Request and Abort-Session-Answer messages. As well, the Diameter Class AVP attribute has the same specification and behaviour as the RADIUS Class attribute.

Mobile Device Storage of User Session Identifier

Although an 'always-on' session may consist of multiple data sessions segments, the user experiences this as a single contiguous session regardless of handoff between the network elements.

In addition, a mobile node may be capable of handling multiple user sessions simultaneously. For example, a mobile node running a video streaming application may establish a separate user session with different QoS (quality of service) characteristics than the one used for email retrieval.

In this case, the use of the calling number of the mobile node as the user session identifier is insufficient to serve as a key in our session state store. One solution to this problem is for the AAA server to generate a network-wide unique user session identifier when the mobile node first initiates the user session. This presents another application of the invention which is enabled by the mobile node supporting the storage of a context attribute (hereafter referred to as the User Session Identifier). This User Session Identifier would be received by the mobile node when it first initiates the user session and would be echoed back to the AAA server on subsequent registration requests for the same user session, e.g. following handoff.

For example, in the case of Mobile IP, the User Session Identifier attribute would be returned in the RADIUS Access-Accept (or Diameter AA-Mobile-Node-Answer) message sent by the AAA server to the Foreign Agent on successful initial registration. The Foreign agent would treat the User Session Identifier as opaque data and forward it onto the mobile node as an extension in the MIP-Registration-Reply. The mobile node would include this User Session Identifier extension in all subsequent MIP-Registration-Requests relating to the same user session.

The User Session Identifier would be used by the AAA server in the same way as the calling number in the previous applications in order to locate stale data sessions in the session state store.

While particular embodiments of the present invention have been shown and described, it is clear that changes and modifications may be made to such embodiments without departing from the true scope and spirit of the invention. For example, the invention could be applied to a pre-paid billing system. Pre-paid billing systems rely on very accurate and timely billing information, which can be provided reliably by the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps or may be executed by an electronic system which is provided with means for executing these steps. Similarly, an electronic memory medium such as computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

The invention could, for example, be applied to computers, smart terminals, personal digital assistants and Internet-ready telephones. Again, such implementations would be clear to one skilled in the art from the description herein, and do not take away from the invention.

What is claimed is:

1. A method of session management in a wireless network comprising the steps of:
   in an Authentication, Authorization and Accounting (AAA) server, responding to a request to authorize a data session for a mobile node by:
   determining whether a session state store contains a record of a previous session for said mobile node, and if so:
   retrieving a session key assigned to said previous session for said mobile node;
   returning said session key assigned to said previous session, to an element of said wireless network, said session key assigned to said previous session being stored in a parameter of said response message that said wireless network element will echo back in all future messages related to the current data session;
   whereby said session key can be used to identify all communications between AAA server and wireless network elements for said data session.

2. The method of claim 1, wherein said step of determining further comprises the step of:
   determining whether a session state store contains a record of a previous session for said mobile node, and if not, returning a standard response message.

3. The method of claim 1, wherein elements of said wireless network do not communicate with each other during handoff of the data session.

4. The method of claim 1, wherein billing data is improved by performing the steps of:
   rationalizing billings to said mobile node by:
   comparing session keys in multiple account records; and
   collating account records with like session keys.

5. The method of claim 1 in which said wireless network comprises a CDMA2000 network.

6. The method of claim 5 in which step of returning comprises the steps of:
   transmitting said session key to a Packet Data Serving Node (PDSN) serving said mobile node.

7. The method of claim 6, further comprising the steps of:
   identifying a stale session by detecting that a data session request to a PDSN originates from a mobile node that has a preexisting session on another PDSN.

8. The method of claim 7, further comprising the steps of:
   terminating a stale session by sending a termination request message to a PDSN supporting a stale session.

9. The method of claim 5 in which said step of returning comprises the step of returning said session key to said PDSN in a RADIUS Class attribute.

10. The method of claim 5 in which said step of returning comprises the step of returning said session key to said PDSN in a Diameter Class attribute.

11. The method of claim 5, wherein said session key is stored in a context attribute field of said response message.

12. The method of claim 1, further comprising the step of: authenticating said mobile node and authorizing said data session.

13. A method of session accounting for a wireless network in which network elements do not communicate with one another, said method comprising the steps of:
assigning a session key to a data session;
storing said session key in a context attribute of communications between a mobile unit and said network elements, thereby communicating the state of data sessions on said wireless network, to other elements of said wireless network;
responding to said mobile unit moving from the region covered by a first network element A, to a region covered by a second network element B, by:
said element B detecting the presence of said mobile unit, and sending a communication to a stateful AAA server;
said stateful AAA server:
determining that a session key in said communication from said element B is the same as an earlier session key from said element A, and in response, terminating said data session with said first network element A.

14. An AAA (Authentication, Authorization and Accounting) server comprising:
means responsive to a request for a new data session by:
generating a session key;
establishing a session state store entry indexed by said session key; and
inserting said session key for a state data session in communications regarding said new data session;
means for detecting a context attribute in a message;
means for responding to said context attribute in a message; and
means for responding to said context attribute containing a session key equal to a previously stored session key by:
establishing a new session with a first network element; and terminating a session with a second network element.

15. The AAA server of claim 14, wherein said means responsive to a request comprises:
means for responding to the receipt of an accounting start message from a mobile node by:
creating a new session in its cache to track said data session;
extracting an IP address and Acct-Session-Id from a Class attribute;
searching for a stale session corresponding to said IP address and Acct-Session-Id from said Class attribute; and
responding to the existence of a stale session by:
updating the state of said stale session to "pending deletion".

16. The AAA server of claim 14, wherein said AAA server comprises a stateful Radius server.

17. A system for targeted distribution of content over a communication network comprising:
a mobile node;
a wireless network; and
an Authentication, Authorization and Accounting (AAA) server;
said mobile node and said AAA server being operable to intercommunicate via said wireless network;
said mobile node being operable to transmit a request to establish a new data session, to said AAA server;
said AAA server being operable to respond to said request to establish a new data session by:
generating a session key, distinguishing said data session from other data sessions for said mobile unit:
storing said session key together with mobile node identifier in a session state store; and
returning the session key of a previous data session to an element of said wireless network, said previous session key being stored in a parameter of said response message that said element will echo back in all future messages related to the current data session;
said element of said wireless network being operable to:
receive said new session key; and
echo said new session key back to said AAA server in subsequent AAA messages for the same data session.

* * * * *